United States Patent
Yu

(10) Patent No.: US 12,427,813 B2
(45) Date of Patent: Sep. 30, 2025

(54) TIRE PRESSURE MONITORING DEVICE WITH A DYNAMIC ENERGY-SAVING MECHANISM AND ENERGY-SAVING METHOD OF TIRE PRESSURE MONITORING

(71) Applicant: Chih-Wei Yu, Taipei (TW)

(72) Inventor: Chih-Wei Yu, Taipei (TW)

(73) Assignee: SYSGRATION LTD., Taipei (TW)

( * ) Notice: Subject to any disclaimer, the term of this patent is extended or adjusted under 35 U.S.C. 154(b) by 328 days.

(21) Appl. No.: 18/098,046

(22) Filed: Jan. 17, 2023

(65) Prior Publication Data
US 2023/0234406 A1 Jul. 27, 2023

(30) Foreign Application Priority Data
Jan. 27, 2022 (TW) .................................. 111103658

(51) Int. Cl.
*B60C 23/04* (2006.01)
(52) U.S. Cl.
CPC ................................ *B60C 23/0455* (2013.01)
(58) Field of Classification Search
USPC ....... 340/445, 442, 444, 449, 435, 483, 488, 340/516, 539.21, 539.22, 539.23, 626, 340/661, 691.6, 3.1
See application file for complete search history.

(56) References Cited

U.S. PATENT DOCUMENTS

| | | | |
|---|---|---|---|
| 2005/0057348 A1* | 3/2005 | Hammerschmidt | ........................ B60C 23/0474 340/445 |
| 2007/0159314 A1* | 7/2007 | Zhu | ........................ G01M 17/02 340/442 |
| 2015/0271201 A1* | 9/2015 | Ruvio | ..................... H04L 67/12 726/23 |
| 2021/0188252 A1* | 6/2021 | Lu | ........................ B60W 40/12 |

* cited by examiner

*Primary Examiner* — Daniel Previl

(57) ABSTRACT

A tire pressure monitoring device with a dynamic energy-saving mechanism and an energy-saving method of tire pressure monitoring are provided. The tire pressure monitoring device is installed in a car and includes a plurality of tire pressure detectors and a main control receiver. Through the mutual transmission of signal and information between each tire pressure detector and the main control receiver, the main control receiver or each tire pressure detector can directly control and change the transmission range of each tire pressure detector. The signal range can match the distance between the tire pressure detector and the main control receiver, the closer the distance from the tire pressure detector to the main control receiver is, the smaller the signal range is.

12 Claims, 6 Drawing Sheets

S1 — Initial match: each of the tire pressure detectors has a serial number unit duplex wirelessly connected with a serial number matching unit of the main control receiver.

S2 — First signal match: a detecting unit of each of the tire pressure detectors detects tire pressure and temperature of the corresponding tire and generates a first signal, and the first signal is transmitted to the main control receiver; the main control receiver generates and transmits a feedback information to the tire pressure detectors for a regulating unit to control/ change the signal strength and quality.

S3 — Repeated comparison: each of the tire pressure detectors continuously transmits the first signal to the main control receiver, and the main control receiver continuously generates the feedback information and controls a regulating unit through a control unit to adjust and change the signal strength and quality.

S4 — Memory storage: a database stores the first signal transmitted from the tire pressure detector to the main control receiver.

FIG.5

TIRE PRESSURE MONITORING DEVICE WITH A DYNAMIC ENERGY-SAVING MECHANISM AND ENERGY-SAVING METHOD OF TIRE PRESSURE MONITORING

FIELD OF THE DISCLOSURE

The present disclosure is related to a tire pressure monitoring device with a dynamic energy-saving mechanism and an energy-saving method of tire pressure monitoring. More peculiarly, the device of the present disclosure includes a main control receiver disposed on any part of a car. The tire pressure detector can communicate with the main control receiver, and further adjust the transmit power, receiving sensitivity or data update times, so that the main control receiver can match the tire pressure detector with the best status, and extend the usage life of the tire pressure detector.

BACKGROUND OF THE DISCLOSURE

Nowadays, in the relevant regulations of driving safety, in order to avoid danger during driving, the preparation before driving is essential. For this reason, in recent years, the relevant regulations for cars have been strictly regulated that a car must be equipped with tire pressure detectors, so that the driver can check whether the tire pressure of each tire is normal before driving to ensure the safety of each tire.

The tire pressure detector installed on each tire will broadcast one-way transmit the information about each tire to the receiving device installed in the car (which can be connected to the car computer, or an independent device), so that the driver can directly monitor the current status of each tire. However, in order to facilitate the driver's viewing, the receiving device will be installed near the driver's seat, which results in the distances between the location of each tire and the receiving device being different.

Further due to the distance between each tire and the receiving device, the distances between each tire pressure detector and the receiving device are different. In order to allow the receiving device to receive the signal and data completely, the signal range detected by each tire pressure detector is fixed. However, the tire pressure detector closest to the receiving device wastes too much efficacy on transmitting and produces the same result as the farther tire pressure detector. This method is undoubtedly a waste of electricity for the closer tire pressure detector, which will shorten the service life of the tire pressure detector. However, broadcast-oriented tire pressure detectors cannot perform information exchange to achieve performance optimization. The relevant industries are eager to improve the problems mentioned above.

With the development of technology, duplex connection-oriented tire pressure detectors are gradually introduced into the market. The technology based on duplex connection can achieve more flexible product functions. Therefore, the present disclosure aims at developing an electricity-saving mechanism based on duplex transmission.

SUMMARY OF THE DISCLOSURE

The main purpose of the present disclosure is to provide a tire pressure monitoring device with a dynamic energy-saving mechanism and the method thereof. Specifically, the present disclosure allows the signal transmitted by each tire pressure detector to be the most appropriate relative to the device's location.

Further, the present disclosure reduces excessive electricity consumption, and maintains the service life of each tire pressure detector. The present disclosure improves the matching between the conventional tire pressure detector and the receiving device, and thereby quickly improves the disadvantage of service life of the tire pressure detector.

In order to achieve the object and the advantage mentioned above, the present disclosure provides two embodiments. Firstly, the first embodiment of the present disclosure is a tire pressure monitoring device with a dynamic energy-saving mechanism, which is installed in a car. The tire pressure detector includes: a plurality of tire pressure detectors and a main control receiver.

The plurality of tire pressure detectors are mounted on a plurality of car tires. In detail, each tire pressure detector includes a regulating unit and a detecting unit; wherein the detecting unit detects tire pressure and temperature of the corresponding tire and generates a first signal. The first signal is transmitted through a first transceiver unit of the tire pressure detector. The regulating unit adjusts and changes the signal strength, receiving sensitivity or data update times of the first transceiver unit.

The main control receiver is installed in the car and duplex wirelessly connected with each of the tire pressure detectors. The main control receiver includes a second transceiver unit and a control unit. The second transceiver unit receives and converts the first signal into a second signal. The control unit wirelessly controls the regulating unit of each tire pressure detector according to the second signal to adjust and change the signal strength, receiving sensitivity or data update times.

Further, the second embodiment of the present disclosure is a tire pressure monitoring device with a dynamic energy-saving mechanism, which is installed on a car, the tire pressure monitoring device includes a plurality of tire pressure detectors and a main control receiver.

In detail, the plurality of tire pressure detectors, mounted on a plurality of car tires; wherein each tire pressure detector includes a regulating unit and a detecting unit; wherein the detecting unit detects tire pressure and temperature of the corresponding tire and generates a first signal, the first signal is transmitted through a first transceiver unit of the tire pressure detector; wherein the regulating unit adjusts and changes the signal strength, receiving sensitivity or data update times of the first transceiver unit.

The main control receiver is mounted in the car and duplex wirelessly connected with each of the tire pressure detectors. In detail, the main control receiver includes a second transceiver unit. After the first signal of each of the tire pressure detectors is transmitted to the second transceiver unit, the second transceiver unit generates and transmits a feedback information back to the first transceiver unit. After receiving the feedback information, each of the tire pressure detectors activates the regulating unit, and the regulating unit adjusts and changes the signal strength, receiving sensitivity or data update times of the first transceiver unit according to the feedback information.

Through the repeated signal transmission between the tire pressure detectors and the main control receiver, the signal transmission range of each tire pressure detector in the transmission of the first signal can be matched with the main control receiver.

Furthermore, according to the first embodiment, the present disclosure includes an energy-saving method for a tire pressure monitoring device. The method includes initial match, first signal match, repeated comparison, and memory storage.

Initial match: supplying power to a plurality of tire pressure detectors and a main control receiver for operation when starting a car; wherein the plurality of tire pressure detectors are mounted on a plurality of car tires, and the main control receiver is installed in the car; wherein each of the tire pressure detectors has a serial number unit duplex wirelessly connected with a serial number matching unit of the main control receiver.

First signal match: when the car activates, a detecting unit of each of the tire pressure detectors detects tire pressure and temperature of the corresponding tire and generates a first signal, and the first signal is duplex wirelessly transmitted through a first transceiver unit of the tire pressure detector to a second transceiver unit of the main control receiver; wherein the main control receiver generates a second signal according to the signal strength and quality of transmitting the first signal; wherein the main control receiver includes a control unit wirelessly controlling a regulating unit of each tire pressure detector to adjust and change the signal strength, receiving sensitivity or data update times of the first transceiver unit according to the second signal when transmitting the first signal.

Repeated comparison: during the car driving time, each of the tire pressure detectors continuously transmits the first signal to the second transceiver unit of the main control receiver, and continuously generates the second signal, so that the regulating unit adjusts and changes the signal strength, receiving sensitivity or data update times of the first transceiver unit when transmitting the first signal according to the second signal.

Memory storage: after the car is turned off, a database of the main control receiver stores information, signal strength, signal quality and the serial number unit of each tire pressure detector, so that the main control receiver can directly connect to each tire pressure detector for the subsequent activation of the car.

Moreover, according to the second embodiment, the present disclosure includes an energy-saving method of tire pressure monitoring. The method includes initial match, first signal match, repeated comparison, and memory storage.

Initial match: supplying power to a plurality of tire pressure detectors and a main control receiver for operation when starting a car; wherein the plurality of tire pressure detectors are mounted on a plurality of car tires, and the main control receiver is installed in the car; wherein each of the tire pressure detectors has a serial number unit duplex wirelessly connected with a serial number matching unit of the main control receiver.

First signal match: when the car activates, a detecting unit of each of the tire pressure detectors detects tire pressure and temperature of the corresponding tire and generates a first signal, and the first signal is duplex wirelessly transmitted through a first transceiver unit of the tire pressure detector to a second transceiver unit of the main control receiver; wherein the main control receiver generates a feedback information according to the signal strength, receiving sensitivity and data update times of transmitting the first signal; wherein the main control receiver includes a second transceiver unit transmitting the feedback information to the first transceiver unit, a regulating unit of each tire pressure detector adjusts and changes the signal strength, receiving sensitivity or data update times of the first transceiver unit according to the second signal when transmitting the first signal.

Repeated comparison: during the car driving time, each of the tire pressure detectors continuously transmits the first signal to the second transceiver unit of the main control receiver, and continuously generates the feedback information, so that the regulating unit adjusts and changes the signal strength, receiving sensitivity or data update times of the first transceiver unit when transmitting the first signal according to the feedback information.

Memory storage: after the car is turned off, a database of the main control receiver stores information, signal strength, signal quality and the serial number unit of each tire pressure detector, so that the main control receiver can directly connect to each tire pressure detector for the next activation of the car.

In summary, the advantage of the present disclosure is that each tire pressure detector matches the main control receiver. Each of the tire pressure detectors can adjust and change the signal strength, receiving sensitivity or data update times of the first signal transmitted by the first transceiver unit according to the distance between the tire pressure detector and the main control receiver.

That is to say, the closer the tire pressure detector is to the main control receiver, the smaller the range of the signal strength it transmits (but the signal strength shall still be based on the range that the main control receiver can receive). In other words, the signal transmitting range of the tire pressure detector closer to the main control receiver is smaller than the signal transmitting range of the tire pressure detector farther away from the main control receiver, so that the service life of each tire pressure detector can be maintained without all the tire pressure detector being electricity-consumed.

Therefore, the tire pressure monitoring device of the present disclosure is very practical and progressive, and is quite worthy of being promoted by the industry and made public to the public.

BRIEF DESCRIPTION OF THE DRAWINGS

The described embodiments may be better understood by reference to the following description and the accompanying drawings in which:

FIG. 5 is a flowchart of the second embodiment of the present disclosure.

DETAILED DESCRIPTION OF THE EXEMPLARY EMBODIMENTS

Figure 1:
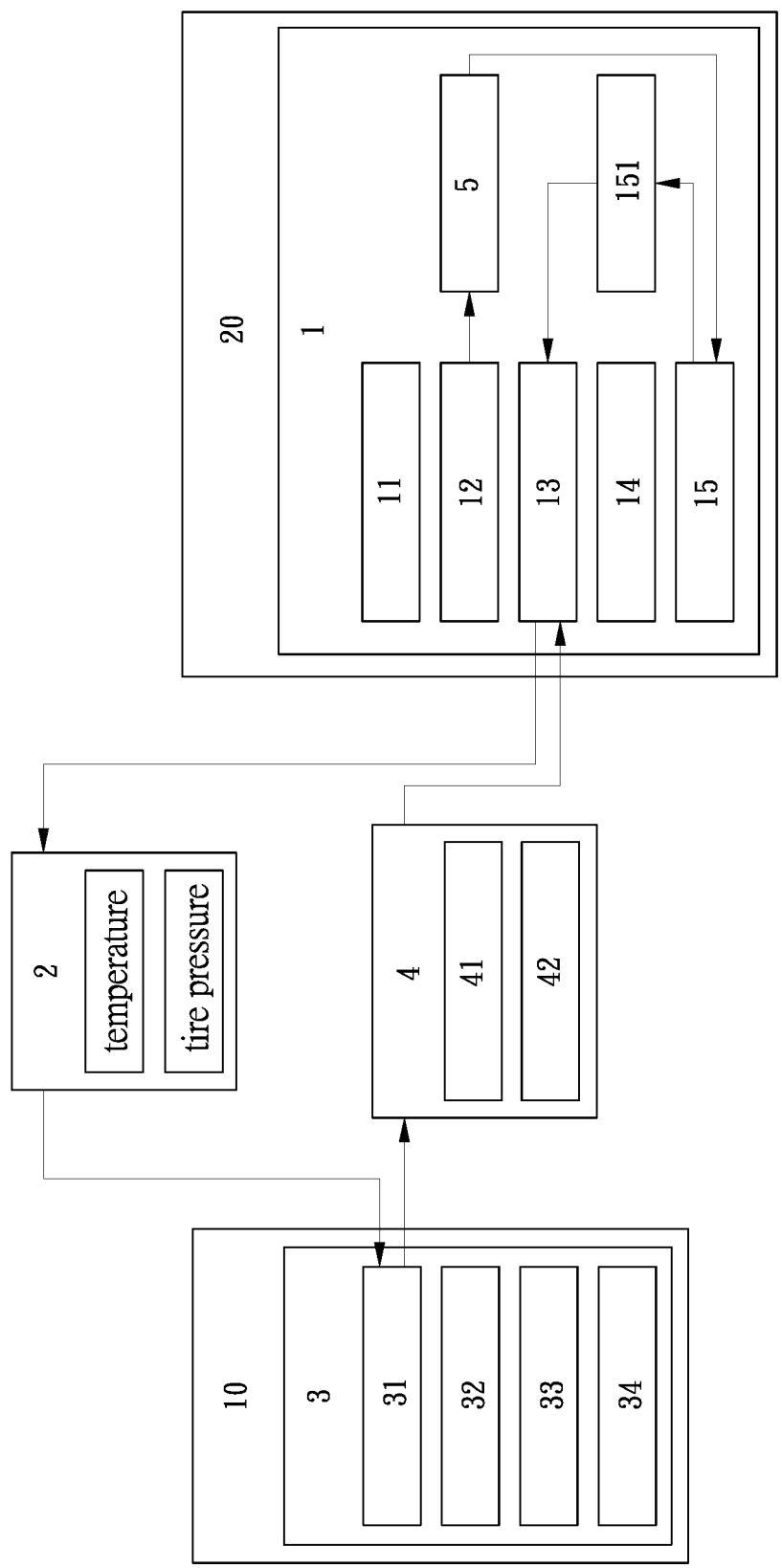
FIG. 1 is a block schematic diagram of the first embodiment of the present disclosure.
Figure 2:
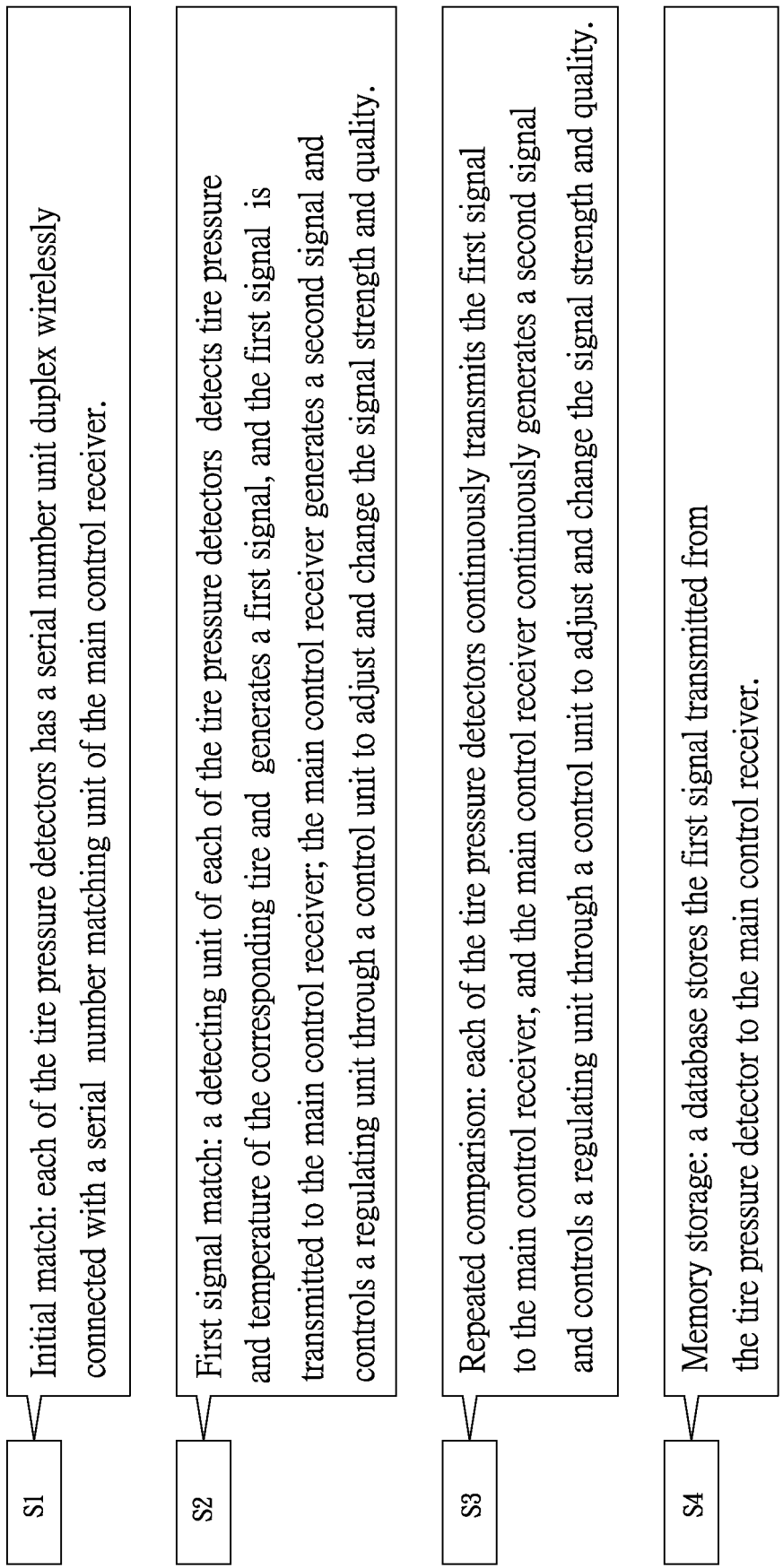
FIG. 2 is a flowchart of the first embodiment of the present disclosure.
Figure 3:
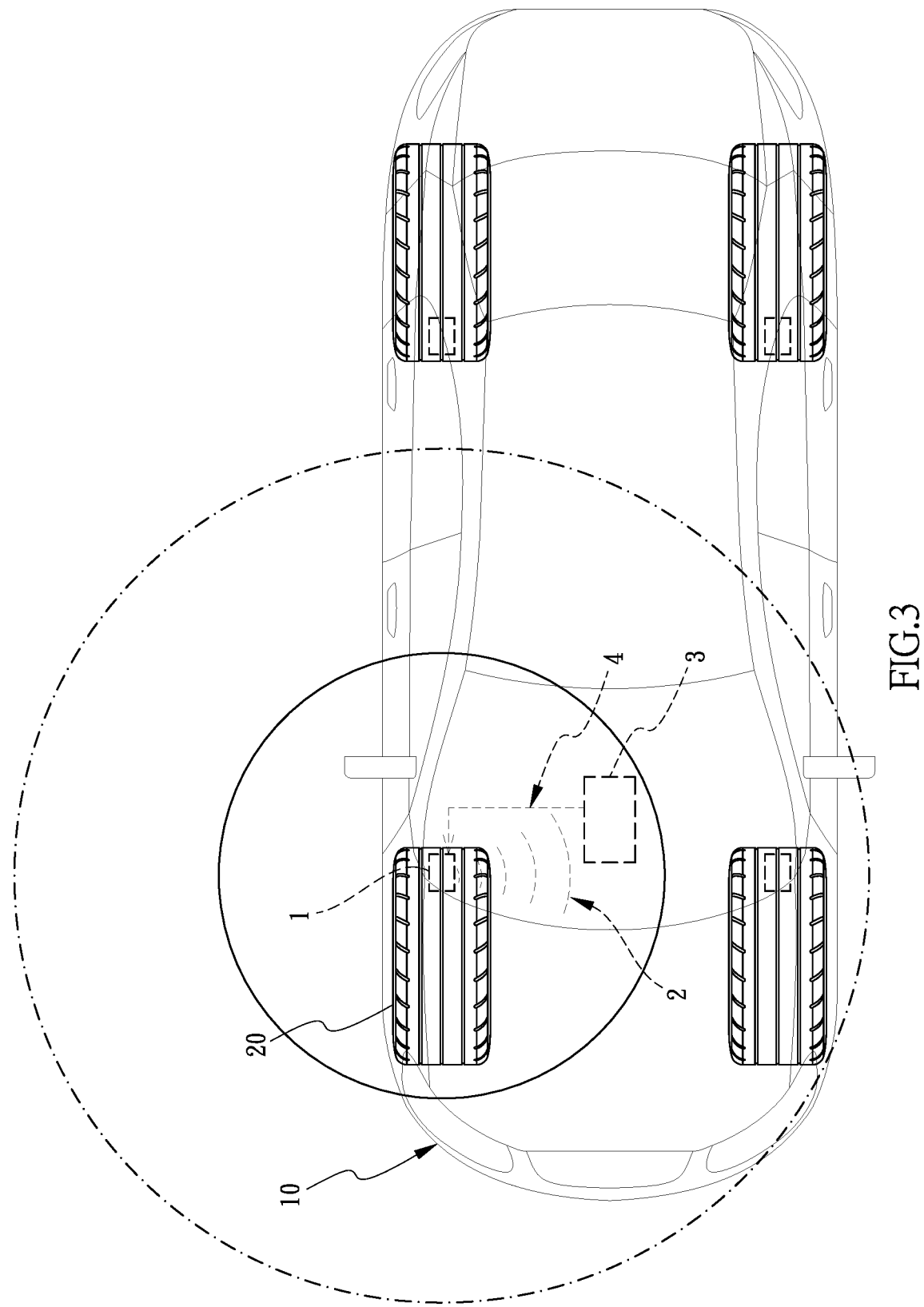
FIG. 3 is a schematic diagram of the signal adjustment of one of the tire pressure detectors applied in the car of the first embodiment of the present disclosure.

The construction and method of operation of the present disclosure, together with additional objects and advantages thereof, will be best understood from the following description of one or more embodiment(s) when read in connection with the accompanying drawings. Referring to FIG. 1 to FIG. 6, firstly, the structure of the present disclosure includes two embodiments. The first embodiment of the present disclosure (as shown in FIG. 1 to FIG. 3) is a tire pressure monitoring device with a dynamic energy-saving mechanism, installed in a car 10. The tire pressure monitoring device includes a plurality of tire pressure detector 1 and a main control receive 3. The plurality of tire pressure detectors 1 are mounted on a plurality of tires 20 of the car 10 respectively. Each tire pressure detector 1 includes a regulating unit 11 and a detecting unit 12. The detecting unit 12 detects tire pressure and temperature of the corresponding tire 20 and generates a first signal 2, the first signal 2 is transmitted through a first transceiver unit 13 of the tire pressure detector 1. The regulating unit 11 adjusts and changes the signal strength, receiving sensitivity, or data update times of the first transceiver unit 13. The main control receiver 3 is mounted in the car 10 and connected with every tire pressure detector 1. The main control receiver 3 includes a second transceiver unit 31 and a control unit 32. The second transceiver unit 31 receives and converts the first signal 2 into a second signal 4, and the control unit 32 wirelessly controls the regulating unit 11 of each tire pressure detector 1 according to the second signal 4 to adjust and change the signal strength, receiving sensitivity or data update times when the first transceiver unit 13 transmitting the first signal 2.

According to the first embodiment of the present disclosure, the present disclosure further provides an energy-saving method of tire pressure monitoring, including: initial match S1, first signal match S2, repeated comparison S3, and memory storage S4.

Initial match 1: supplying power to a plurality of tire pressure detectors 1 and a main control receiver 3 for operation when starting a car 10; wherein the plurality of tire pressure detectors 1 are mounted on a plurality of tires 20 of the car 10, and the main control receiver 3 is installed at any part in the car 10; wherein each of the tire pressure detectors 1 has a serial number unit 14 duplex wirelessly connected with a serial number matching unit 33 of the main control receiver 3.

First signal match S2: when the car 10 is activated, a detecting unit 12 of each of the tire pressure detectors 1 detects tire pressure and temperature of the corresponding tire 20 and generates a first signal 2, and the first signal 2 is duplex wirelessly transmitted through a first transceiver unit 13 of the tire pressure detector 1 to a second transceiver unit 31 of the main control receiver 3. The main control receiver 3 generates a second signal 4 according to the signal strength, receiving sensitivity or data update times of transmitting the first signal 2. The main control receiver 3 includes a control unit 32 wirelessly controlling a regulating unit 32 of each tire pressure detector 1 to adjust and change the signal strength, receiving sensitivity or data update times of the first transceiver unit 13 when transmitting the first signal 2 according to the second signal 4.

Repeated comparison S3: during the car driving time, each of the tire pressure detectors 1 continuously transmits the first signal 2 to the second transceiver unit 31 of the main control receiver 3, and continuously generates the second signal 4, so that the regulating unit 11 adjusts and changes the signal strength, receiving sensitivity or data update times of the first transceiver unit 13 when transmitting the first signal 2 according to the contents of the second signal 4.

Memory storage S4: after the car 10 is turned off, a database 34 of the main control receiver 3 stores information, signal strength, signal quality and the serial number unit 14 of each tire pressure detector 1, so that the main control receiver 3 can directly connect to each tire pressure detector 1 for the next activation of the car 10.

Specifically, the structure and the steps are described as follows. When the car 10 is powered on and activated, the electricity will be supplied to each tire pressure detector 1 and the main control receiver 3 for operation. After starting up and operating, each tire pressure detector 1 will first perform a matching connection by a serial number unit 14 of each tire pressure detector 1 to match the serial number matching unit 33 of the main control receiver 3 in a duplex wirelessly connection mode. In detail, the duplex wirelessly connection method can be any Bluetooth, ZigBee, LoRa, Sigfox, or NB-IoT. After confirming the connection, the main control receiver 3 or the screen connected with the main control receiver 3 will display the temperature and tire pressure of each tire 20 (the record before the last time the car 10 was turned off). Then the car 10 will start to move and transmit signals between each tire pressure detector 1 and the main control receiver 3.

Firstly, each tire pressure detector 1 generates the first signal 2 about the temperature and tire pressure of the tire 20 when the car 10 moves, and the first signal 2 is transmitted to the second transceiver unit 31 of the main control receiver 3 by the first transceiver unit 13. Then the second transceiver unit 31 generates the second signal 4 according to the transmission signal strength, receiving sensitivity or data update times of the first signal 2, so that the content of the second signal 4 includes the content of the first signal 2, a signal strength information 41 and a signal quality information 42 generated during the transmission of the first transceiver unit 13. When the second signal 4 is formed, the control unit 32 of the main control receiver 3 controls the operation of the regulating unit 11 of each tire pressure detector 1 through a duplex wirelessly connection according to the content of the second signal 4. The regulating unit 11 of each of the tire pressure detectors 1 adjusts and changes the signal strength, receiving sensitivity or data update times of the first transceiver unit 13 when transmitting the first signal 2 according to the contents of the second signal 4. As shown in FIG. 3, when the first signal 2 has not been transmitted to the main control receiver 3, the signal strength range of the first signal 2 transmitted by the first transceiver unit 13 is the dotted line. When the first signal 2 is transmitted to the main control receiver 3, each regulating unit 11 adjusts the signal strength range of the first transceiver unit 13 transmitting the first signal 2 is the solid line.

According to the above description, it can be seen that the closer the tire pressure detector 1 is to the main control receiver 3, the signal strength range of the first transceiver unit 13 for transmitting the first signal 2 becomes smaller. However, it remains within the range that the main control receiver 3 can receive. Compared with the signal range (dotted line range) initially transmitted, the technical features are more electricity-saving, and the strength of the signal is more solid and concentrated so that signal dissipation can be avoided. Further, due to the signal strength and the narrowing of the range, the electricity is saved which allows the service life of the tire pressure detector 1 can be maintained. The situation of replacing all the tire pressure detectors 1 due to the tire pressure detectors 1 on the car 10 being damaged or the service life being reduced at one time can be avoided, and the cost of replacing the tire pressure detectors 1 frequently can be saved.

Moreover, through the database 34 of the main control receiver 3, the signal strength, receiving sensitivity or data update times transmitted by the first transceiver unit 13 of each tire pressure detector 1 can be recorded and memorized before turning off the car 10 each time. In addition to directly allowing the main control receiver 3 to quickly connect with each of the tire pressure detectors 1 when reactivating the car 10 next time, the first transceiver unit 13 can also directly transmit and connect to the main control receiver 3 in the signal strength, range, and quality matched with distance, which is faster and trouble-saving.

According to the above description, the first signal 2 of the present disclosure includes the temperature and tire pressure of each tire 20 detected by the detecting unit 12. Further, in order to improve the safety of driving, as shown in FIG. 1, the tire pressure detector 1 includes an alert unit 15, the detecting unit of each tire pressure detector 1 detects each tire 20 and generates an abnormal information 5 when an abnormality is found, and transmits the abnormal information 5 to activate the alert unit 15, and the alert unit 15 generates an alert signal 151 according to the abnormal information 5, and transmits the alert signal 151 to the second transceiver unit 31 of the main control receiver 3 together with the first signal 2. Therefore, the present disclosure can remind the driver to pay attention to the condition of each tire 20 in time, and stop driving to ensure safety and solve its problems.

Figure 4:
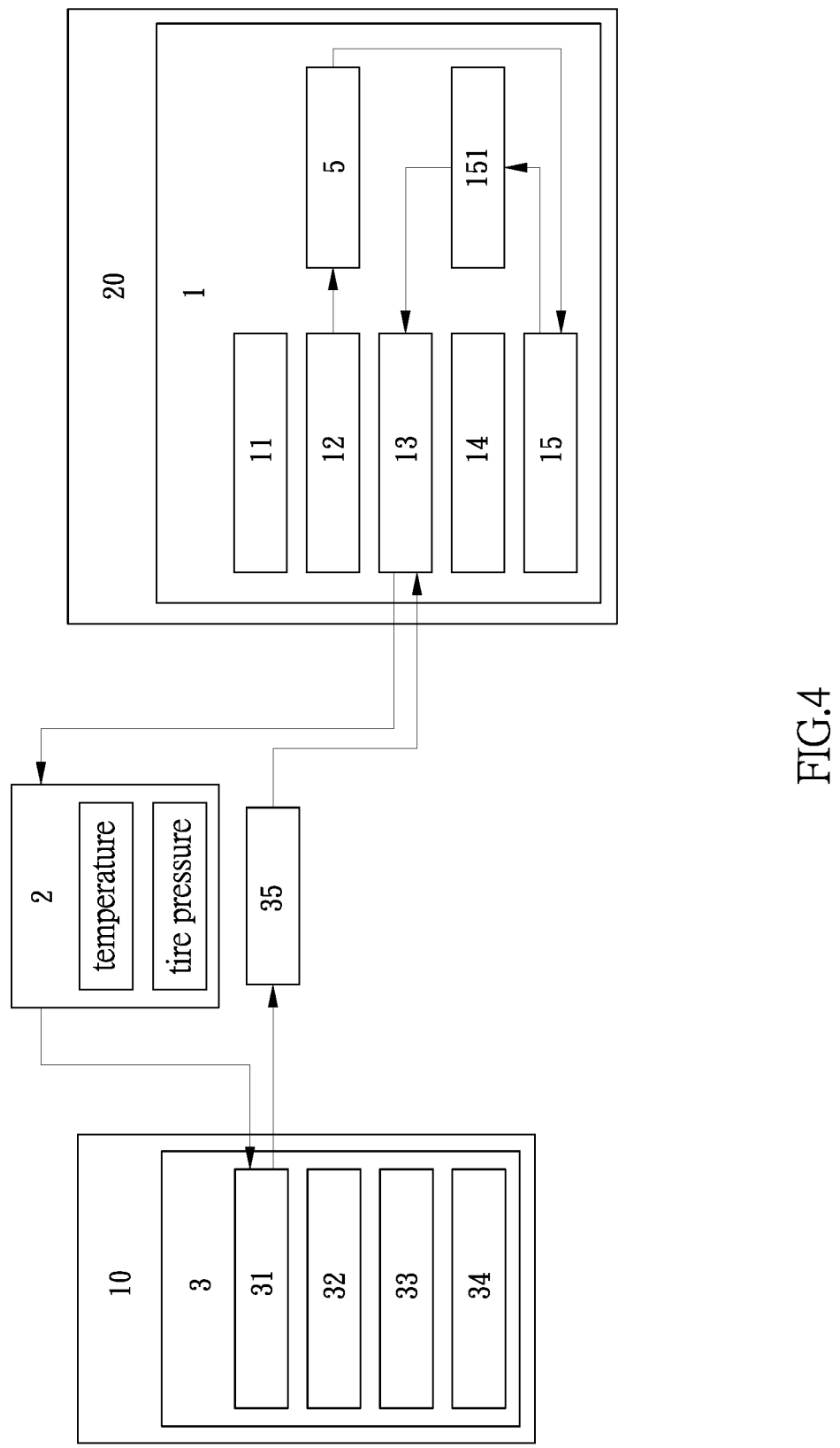
FIG. 4 is a block schematic diagram of the second embodiment of the present disclosure.
Figure 6:
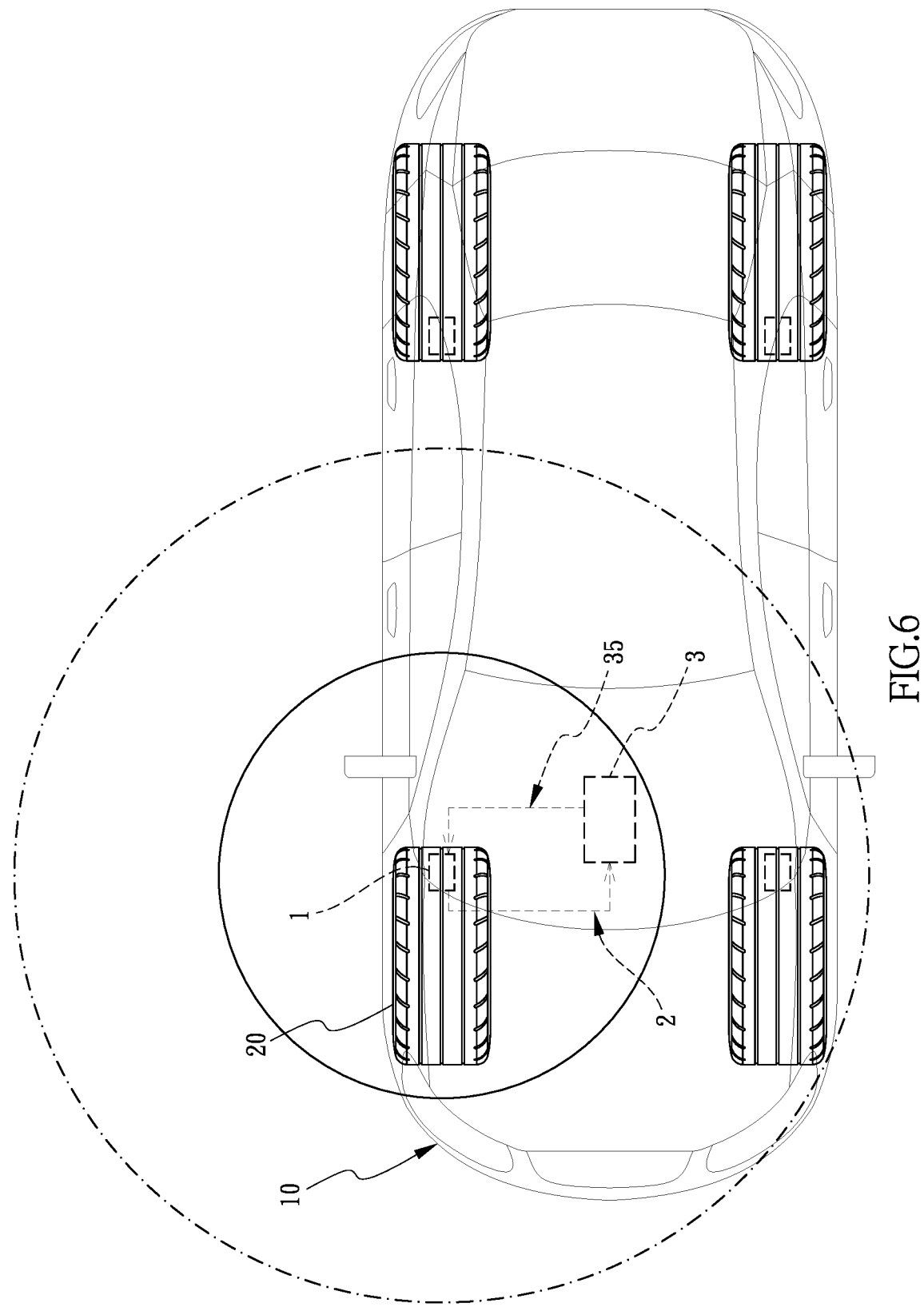
FIG. 6 is a schematic diagram of the signal adjustment of one of the tire pressure detectors applied in the car of the second embodiment of the present disclosure.

Further, the present disclosure provides a second embodiment, as shown in FIG. 4 to FIG. 6. The difference between the first embodiment and the second embodiment is that the first embodiment mainly discloses that the control unit 32 of the main control receiver 3 controls regulating unit 11 of each of the tire pressure detectors 1 to adjust and change the signal strength, receiving sensitivity or data update times of each first transceiver unit 13 when transmitting the first signal 2. On the other hand, the second embodiment provides the regulating unit 11 of each of the tire pressure detectors 1 for adjusting and changing the signal strength, receiving sensitivity or data update times of the first transceiver unit 13 when transmitting the first signal 2 according to the contents of the second signal 4.

Specifically, the second embodiment provides the method that each of the tire pressure detectors 1 generates the first signal 2 and the first signal 2 is transmitted through the first transceiver unit 13 to the second transceiver unit 31, the main control receiver 3 forms the feedback information 35 after comparison and matching. The feedback information 35 includes signal strength information 41 and signal quality information 42. The feedback information 35 is based on the distance between the tire pressure detector 1 and the main control receiver 3 after relevant comparison and calculation. Then the feedback information 35 will be transmitted back to the first transceiver unit 13. The regulating unit 11 of each of the tire pressure detectors 1 adjusts and changes the signal strength, receiving sensitivity or data update times of the first transceiver unit 13 when transmitting the first signal 2 according to the contents of the feedback information 35 transmitted back. Through repeated transmission and comparison, the main control receiver 3 can obtain the best signal strength, receiving sensitivity, or data update times of each tire pressure detector 1 in time.

In summary, according to the structures and methods in the two embodiments of the present disclosure, the driver can notice the various values and parameters of each tire 20 at any time. For each tire pressure detector 1, the signal strength, receiving sensitivity and data update times can be adjusted to match the distance between each of the tire pressure detectors 1 and the main control receiver 3. It is unlike the conventional technology that can only transmit the signal in a fixed range, and causes the shortened service life of each tire pressure detector. Conversely, each of the tire pressure detectors 1 of the present disclosure can automatically and quickly adjust the signal strength, receiving sensitivity or data update times of the first transceiver unit 13 when transmitting the first signal 2 according to the location of the main control receiver 3, so as to reduce excessive electricity consumption, maintain the service life of each tire pressure detector 1, and also save the cost of frequent replacement.

What is claimed is:

1. A tire pressure monitoring device with a dynamic energy-saving mechanism, installed on a car, the tire pressure detector comprising:
    a plurality of tire pressure detectors, mounted on a plurality of car tires; wherein each of the plurality of tire pressure detectors includes a regulating unit and a detecting unit; wherein the detecting unit detects tire pressure and temperature of the corresponding tire and generates a first signal, the first signal is transmitted through a first transceiver unit of the tire pressure detector; wherein the regulating unit adjusts and changes a signal strength, receiving sensitivity or data update times of the first transceiver unit; and
    a main control receiver, mounted in the car and duplex wirelessly connected with every tire pressure detectors; wherein the main control receiver includes a second transceiver unit and a control unit; wherein the second transceiver unit receives and converts the first signal into a second signal, and the control unit wirelessly controls the regulating unit of each tire pressure detector according to the second signal to adjust and change the signal strength, receiving sensitivity or data update times
    wherein, through the signal transmission between each of the tire pressure detectors and the main control receiver, the signal transmission range of each tire pressure detector in the transmission of the first signal can be matched with the main control receiver.

2. The tire pressure monitoring device with a dynamic energy-saving mechanism according to claim 1, wherein the first signal includes the temperature and tire pressure of each tire detected by each of the detecting unit.

3. The tire pressure monitoring device with a dynamic energy-saving mechanism according to claim 2, wherein the second signal includes the first signal and a signal strength information and a signal quality information from each of the first transceiver unit transmitting the first signal to the second transceiver unit.

4. The tire pressure monitoring device with a dynamic energy-saving mechanism according to claim 1, wherein the tire pressure detector includes an alert unit, the detecting unit of each tire pressure detector detects each tire and generates an abnormal information when an abnormality is found, transmits the abnormal information and activates the alert unit, and the alert unit generates an alert signal according to the abnormal information, and transmits the alert signal to the second transceiver unit of the main control receiver together with the first signal.

5. The tire pressure monitoring device with a dynamic energy-saving mechanism according to claim 4, wherein the tire pressure detector duplex is wirelessly connected to the main control receiver through Bluetooth, ZigBee, LoRa, Sigfox or NB-IoT.

6. A tire pressure monitoring device with a dynamic energy-saving mechanism, installed on a car, the tire pressure detector comprising:
    a plurality of tire pressure detectors, mounted on a plurality of car tires; wherein each tire pressure detector includes a regulating unit and a detecting unit; wherein the detecting unit detects tire pressure and temperature of the corresponding tire and generates a first signal, the first signal is transmitted through a first transceiver unit of each of the tire pressure detector; wherein the regulating unit adjusts and changes a signal strength, receiving sensitivity or data update times of the first transceiver unit; and a main control receiver, mounted in the car and duplex wirelessly connected with every tire pressure detector; wherein the main control receiver includes a second transceiver unit; wherein after the first signal of each of the tire pressure detectors is transmitted to the second transceiver unit, the second transceiver unit generates and transmits a feedback information back to the first transceiver unit, after receiving the feedback information, each of the tire pressure detectors activates the regulating unit, and the regulating unit adjusts and changes the signal strength, receiving sensitivity or data update times of the first transceiver unit according to the feedback information;

through the repeated signal transmission between each of the tire pressure detectors and the main control receiver, the signal transmission range of each tire pressure detector in the transmission of the first signal can be matched with the main control receiver.

7. The tire pressure monitoring device with a dynamic energy-saving mechanism according to claim 6, wherein the first signal includes the temperature and tire pressure of each tire detected by each of the detecting unit.

8. The tire pressure monitoring device with a dynamic energy-saving mechanism according to claim 7, wherein the feedback information includes a signal strength information and a signal quality information.

9. The tire pressure monitoring device with a dynamic energy-saving mechanism according to claim 6, wherein the tire pressure detector includes an alert unit, the detecting unit of each tire pressure detector detects each tire and generates an abnormal information when an abnormality is found, transmits the abnormal information and activates the alert unit, and the alert unit generates an alert signal according to the abnormal information, and transmits the alert signal to the second transceiver unit of the main control receiver together with the first signal.

10. The tire pressure monitoring device with a dynamic energy-saving mechanism according to claim 9, wherein the tire pressure detector duplex is wirelessly connected with the main control receiver through Bluetooth, ZigBee, LoRa, Sigfox or NB-IoT.

11. An energy-saving method of tire pressure monitoring, comprising:

initial match: supplying power to a plurality of tire pressure detectors and a main control receiver for operation when starting a car; wherein the plurality of tire pressure detectors are mounted on a plurality of car tires, and the main control receiver is installed in the car; wherein each of the tire pressure detectors has a serial number unit duplex wirelessly connected with a serial number matching unit of the main control receiver;

first signal match: when the car starts to run, a detecting unit of each of the tire pressure detectors detects tire pressure and temperature of the corresponding tire and generates a first signal, and the first signal is duplex wirelessly transmitted through a first transceiver unit of the tire pressure detector to a second transceiver unit of the main control receiver; wherein the main control receiver generates a second signal according to a signal strength and quality of transmitting each of the first signal; wherein the main control receiver includes a control unit wirelessly controlling a regulating unit of each tire pressure detector to adjust and change the signal strength, receiving sensitivity or data update times of the first transceiver unit according to the second signal when transmitting the first signal;

repeated comparison: during the car continuous running time, each of the tire pressure detectors continuously transmits the first signal to the second transceiver unit of the main control receiver, and continuously generates the second signal, so that the regulating unit adjusts and changes the signal strength, receiving sensitivity or data update times of the first transceiver unit when transmitting the first signal according to the second signal; and memory storage: after the car is turned off, a database of the main control receiver stores information, signal strength, signal quality and the serial number unit of each tire pressure detector, so that the main control receiver can directly connect to each of the tire pressure detectors for the next activation of the car.

12. An energy-saving method of tire pressure monitoring, comprising:

initial match: supplying power to a plurality of tire pressure detectors and a main control receiver for operation when starting and driving a car; wherein the plurality of tire pressure detectors are mounted on a plurality of car tires, and the main control receiver is installed in the car; wherein each of the tire pressure detectors has a serial number unit duplex wirelessly connected with a serial number matching unit of the main control receiver;

first signal match: when the car starts to run, a detecting unit of each of the tire pressure detectors detects tire pressure and temperature of the corresponding tire and generates a first signal, and the first signal is duplex wirelessly transmitted through a first transceiver unit of the tire pressure detector to a second transceiver unit of the main control receiver; wherein the main control receiver generates a feedback information according to a signal strength and quality of transmitting the first signal; wherein the main control receiver includes a second transceiver unit transmitting the feedback information to the first transceiver unit, and a regulating unit of each tire pressure detector adjusts and changes the signal strength, receiving sensitivity or data update times of the first transceiver unit according to the second signal when transmitting the first signal;

repeated comparison: during the car continuous running time, each of the tire pressure detectors continuously transmits the first signal to the second transceiver unit of the main control receiver, and continuously generates the feedback information, so that the regulating unit adjusts and changes the signal strength, receiving sensitivity or data update times of the first transceiver unit when transmitting the first signal according to the feedback information; and memory storage: after the car is turned off, a database of the main control receiver stores the feedback information and the serial number unit of each tire pressure detector, so that the main control receiver can directly connect to each of the tire pressure detectors for the next activation of the car.

* * * * *